Sept. 10, 1935. C. F. KOHM 2,014,023
METHOD AND MEANS FOR CONNECTING CHAIN LINKS
Filed May 29, 1934 3 Sheets-Sheet 3
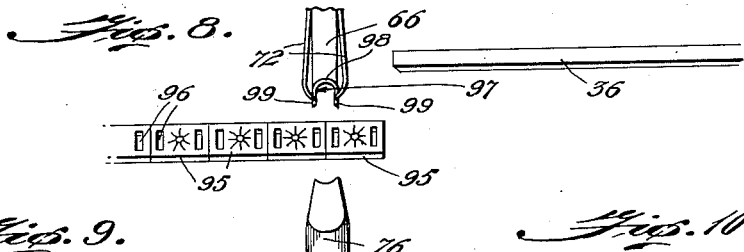
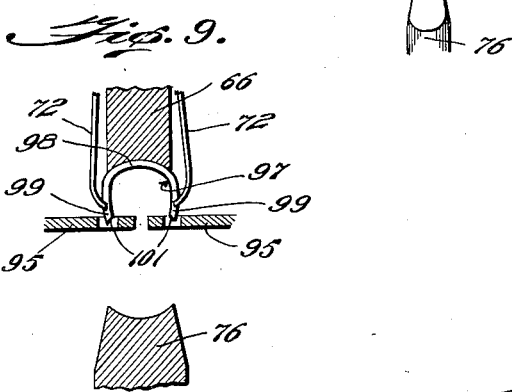
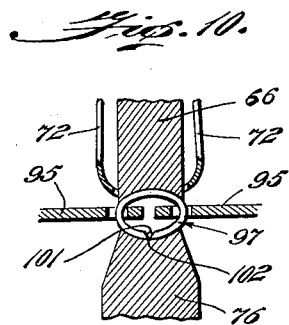
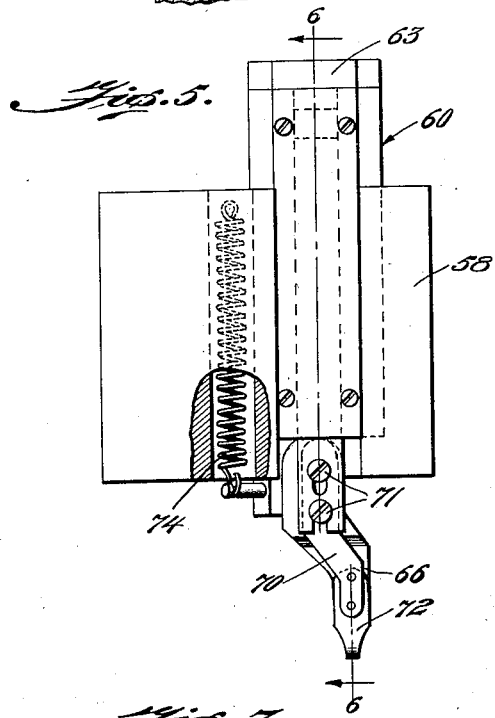
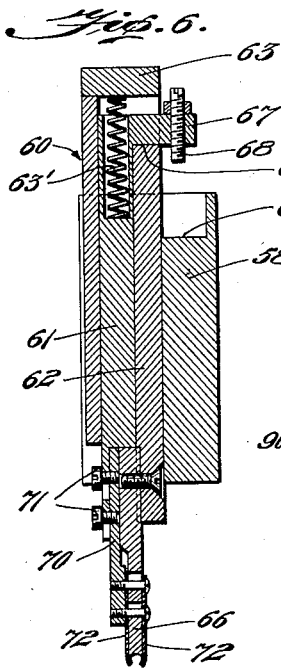
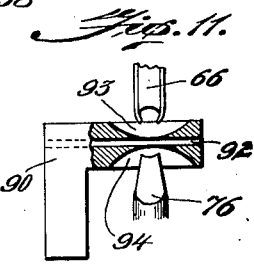
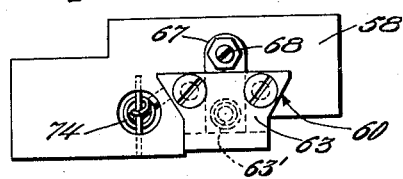

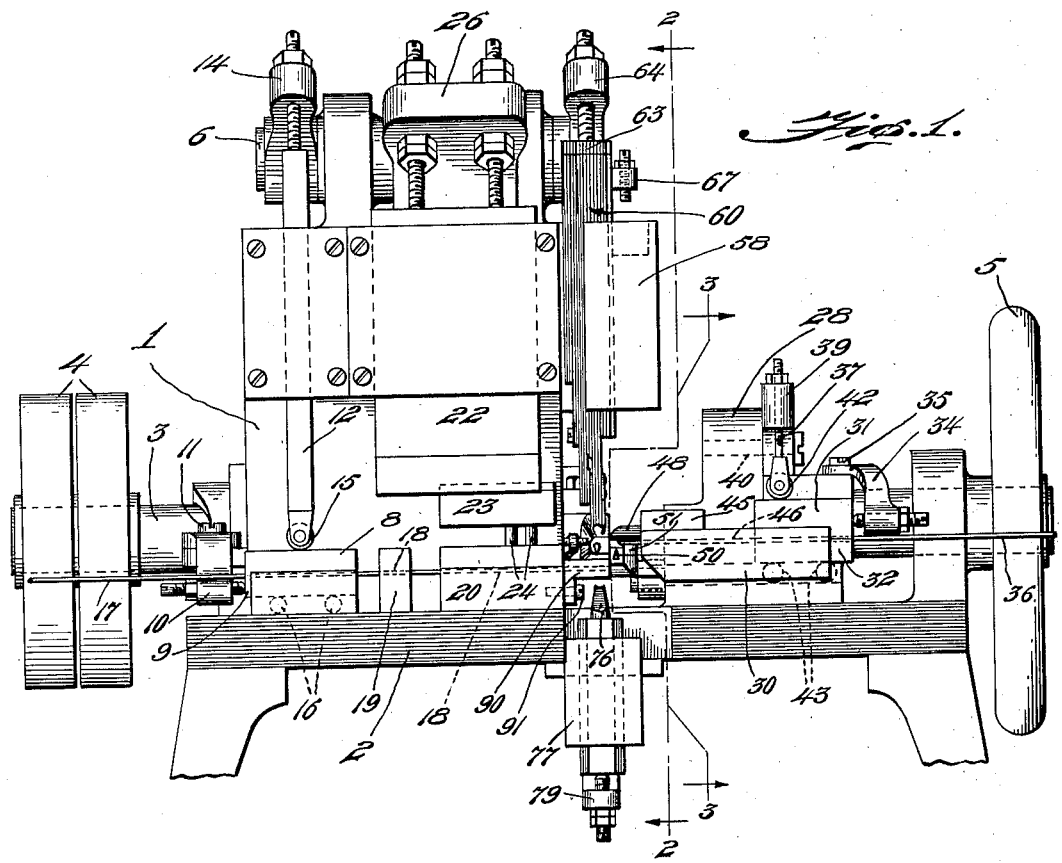

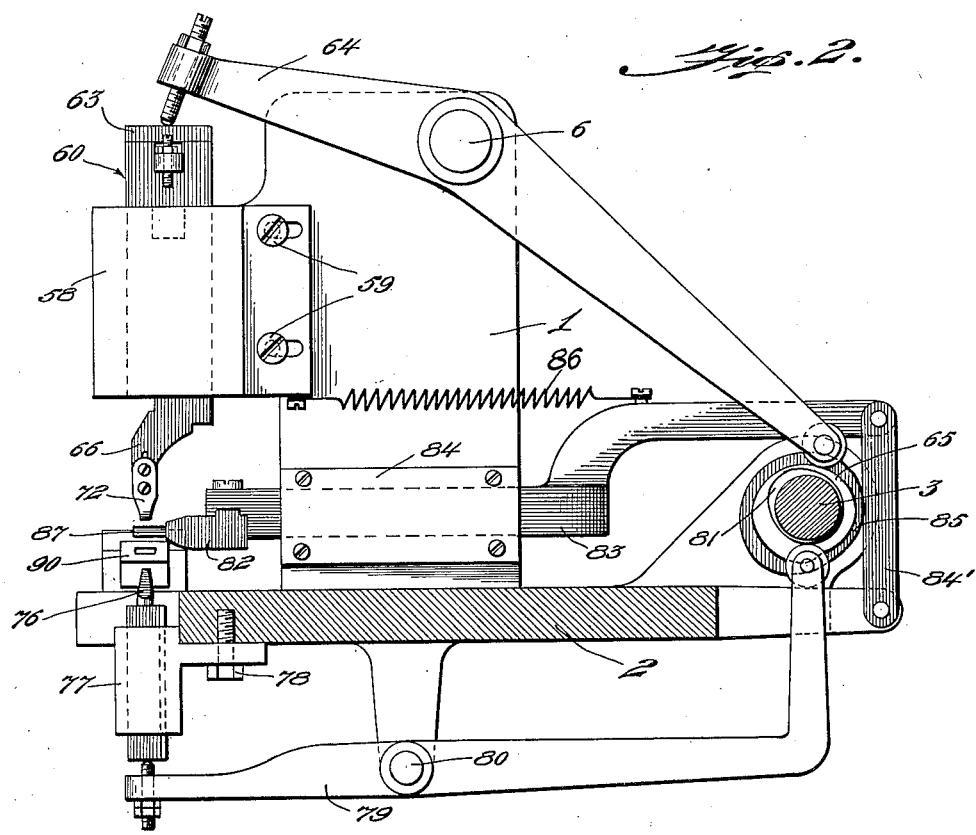

Patented Sept. 10, 1935

2,014,023

UNITED STATES PATENT OFFICE 2,014,023

METHOD AND MEANS FOR CONNECTING CHAIN LINKS

Christian F. Kohm, Cranston, R. I., assignor to Speidel Corporation, Providence, R. I., a corporation of Rhode Island Application May 29, 1934, Serial No. 728,057

20 Claims. (Cl. 59—35)

This invention relates to an improved method and means for connecting chain links and comprises automatically operated means adapted for use in conjunction with a chain making machine for forming and applying the connecting members as a separate step in the chain formation.

One object of the invention is the provision of operating mechanism capable of actuation by the operating elements of a chain making machine for forming and applying separate connecting members to the chain links in the formation of a continuous chain.

Another object of the invention is the provision of novel cutting, forming and feeding mechanism for cutting, forming and inserting chain connecting elements into opposite chain links and then shaping the connecting elements to form with the chain links a complete chain.

Another object of the invention is the provision of a novel form of connecting member holding and transfer mechanism for inserting the formed connecting members within openings in the chain links in such a manner that the connecting members may be inserted at substantially right angles to the plane of the chain links to fit closely within narrow slots formed in the chain links.

Another object of the invention is the provision of a novel form of cutter for the connecting members capable of forming oppositely inclined end surfaces adapted to be turned into substantially outwardly meeting edge relation when the connecting members are applied to adjacent chain links.

A further object of the invention is the provision of a series of novel operating steps for forming and inserting a connecting member in chain links in such a manner that the end portions of the connecting member are adapted to lie in substantially parallel planes before insertion within the link members and are inserted along substantially straight line paths to fit within narrow receiving slots formed in the chain links.

Another object of the invention is the provision of an improved method of forming and applying connecting members to chain links which comprises the shaping of the connecting members and their application to the chain links in such a manner as to provide edge engaging end surfaces upon opposite ends of the connecting members substantially interfitting together when bent to connect adjacent chain links.

A further object of the invention is the provision of a novel form and arrangement of connecting member shaping and feeding means adapted for cooperative operation in shaping and transferring the connecting members.

Another object of the invention is the provision of novel holding and severing means for the metal strip sections employed in forming the connecting members, as well as novel holding and shaping means therefor.

A further object of the invention is the provision of an improved connecting member holding and transfer means for inserting the connecting members within the chain links in such a manner as to fit closely within the openings formed in the chain link.

Other objects of the invention relate to various improved parts and arrangements of parts and various novel steps and combinations of steps for forming and shaping link connecting members, as well as applying them to and shaping them into binding relation with the chain links as will be more fully set forth in the detailed description to follow.

Referring to the drawings:—

Fig. 1 is a front elevational view of one form of chain making machine to which the improved connecting member forming and operating means may be applied for cooperative action in connection with the chain link forming mechanism, Fig. 2 is a vertical sectional view showing certain of the parts of the machine shown in Fig. 1, taken substantially along the line 2—2 of Fig. 1, Fig. 3 is a vertical sectional view, taken substantially along the line 3—3 of Fig. 1, showing the cutter bar and operating means therefor with relation to its support and to the main cam shaft and associated elements, Fig. 4 is an enlarged perspective view of the mechanism for cutting, shaping and transferring the connecting members with the chain links omitted, Fig. 5 is a side elevational view of the connecting member holding and transfer mechanism, Fig. 6 is a vertical sectional view, taken substantially along the lines 6—6 of Fig. 5, Fig. 7 is a top plan view of the mechanism shown in Fig. 5, Fig. 8 is a diagrammatic view of the metal strip from which the chain links are formed showing separated links in position to be connected together with the relative position of the metal strip from which the connecting members are formed, and a connecting member after being separated from the stock and shaped, as it is being conveyed into position for connecting adjacent links, Fig. 9 is an enlarged detail sectional view showing the connecting member as its end portions are first inserted within the openings in the chain links, Fig. 10 is an enlarged detail sectional view showing the final bending of a connecting member after its insertion within openings in adjacent links to form a chain, and, Fig. 11 is a side elevational view of a portion of the link supporting shelf, partially in section, to illustrate the former receiving openings in the shelf.

In the form of mechanism illustrated herewith for shaping and advancing the chain links after their formation from a metal strip, as well as the means for supporting and operating the connecting member forming and attaching means in association therewith, 1 designates generally a machine frame supported by a base 2 and provided with a cam shaft 3 adapted to be operated by a power pulley 4 or a hand wheel 5, and a main supporting shaft 6 for pivotally supporting certain of the chain link feeding and shaping mechanism as well as portions of the connecting member shaping and transfer means.

An intermittent feed mechanism is supported by the base 2 and comprises gripping blocks 8 and 9 movable transversely of the machine by means of a rocker arm 10, which may be pivotally mounted, as at 11, and actuated in any suitable manner from the cam shaft 3. The gripping blocks 8 and 9 are brought into gripping engagement with the metal strip by means of a suitable plunger 12, actuated by a rocker arm 14 which is pivotally supported by the shaft 6, the plunger 12 being provided with a contact roll 15 engaging the block 8 and cooperating with one or more similar rolls 16 in engagement with the block 9 for effecting movement of the blocks 8 and 9 from left to right, as shown in Fig. 1 of the drawings, under the influence of the arm 10, while the blocks are held in gripping engagement with the metal strip 17 to advance the same through channels 18 formed in the guide block 19 and die block 20. Any suitable resilient means (not shown) may be provided for separating the blocks 8 and 9 and returning them to their initial positions after having advanced the metal strip 17 as previously described.

A chain link shaping and separating mechanism is located at the right of the intermittent feed mechanism previously described, as seen in Fig. 1 of the drawings, and comprises a vertically movable plunger 22 slidably mounted in the frame 1 and provided with a head 23 adapted to support two or more dies 24 for cooperation with suitable means carried by the die block 20 in shaping the chain links and separating them from the metal strip 17. An actuating arm 26 for moving the plunger 22 downwardly is pivotally supported by the shaft 6 and may be actuated in any suitable manner, as from the cam shaft 3. Suitable resilient means or positively operated mechanism may be provided for raising the plunger 22 after its downward movement under the influence of the arm 26. The channel 18 formed in the die block 20 provides a suitable guideway both for the metal strip 17, and the chain links, after their separation therefrom, to maintain them in proper alignment and in suitable proximity to each other for receiving the connecting members.

The mechanism above described is more or less conventional in chain making machines and is shown and described herein more particularly for the purpose of illustrating one form of chain making machine with which my improved connecting member forming and attaching means is adapted to be employed, although it is to be understood that this illustrated mechanism in no way limits the application of the connecting member forming and attaching means as regards its application to or employment with other types of chain link forming mechanisms with which it may be capable of use.

A supporting member 28 is carried by the base 2 and supports a guide block 30 carrying an intermittent feed mechanism comprising gripping blocks 31 and 32 slidably supported by the guide block 30 and movable to the left, as shown in Fig. 1, by a rocker arm 34 pivotally supported by the block 28, as at 35, and which may be actuated in any suitable manner, as from the cam shaft 3. The blocks 31 and 32 are held in gripping engagement with the metal strip 36 while advancing the same towards the left, as shown in Fig. 1, by means of a suitable pressure member 37 carried by a rocker arm 39 which is pivotally supported by a pin 40 carried by the block 28 and which may be actuated by a suitable cam 41 carried by the cam shaft 3. The pressure member 37 is provided with a roll 42, engaging the block 31 and cooperating with one or more rolls 43, engaging the block 32, for facilitating the movement of the blocks to advance the metal strip 36. Any suitable resilient means may be provided for separating the gripping blocks 31 and 32 and returning them to their initial positions after actuation by the arm 34. A guide block 45 is also firmly secured to the guide block 30 or supporting member 28, and is provided with a guide channel 46 for guiding the metal strip 36 as it is advanced by the gripping blocks 31 and 32, as well as a projecting anvil 48 adapted for cooperation with a suitable cutter in severing sections of the desired lengths from the metal strip 36.

A cutter blade 50 is supported by a head 51, which may be mounted upon and supported in offset relation with a rocker arm 52. The rocker arm 52 is pivotally supported by a pin 53 carried by the supporting block 28, and is provided with a contact portion 54 for engagement with a cam 55 carried by the cam shaft 3 whereby the cutter blade may be brought into substantial contact with the anvil 48 at appropriate intervals to sever sections from the metal strip 36. It will be noted that the cutter blade 50 has a cutting edge provided with oppositely inclined surfaces and moves upwardly against the anvil 48, thus forming sections having their end faces provided with inclined surfaces extending outwardly and upwardly from the lower side of the metal strip 36.

A supporting member 58 is secured to a portion of the frame 1, as by screws 59, and carries a compound slide 60 comprising inner and outer slidable members 61 and 62 which are normally retained in substantially fixed relation with each other by a coiled spring 63'. The outer slide 62 is mounted for longitudinal sliding movement within the supporting member 58, and is provided with a head 63 engageable by one end of a rocker arm 64 to force the slide 62 downwardly within the supporting member 58. The rocker arm 64 may be pivotally supported by the shaft 6 and actuated by a suitable cam 65 carried by the cam shaft 3. The slide 62 carries a former 66 fixedly secured thereto and movable therewith in all positions of the slide 62. The inner slide 61 may be mounted inwardly of the slide 62, or may be slidably mounted within a channel formed in one face of the slide 62, as shown in Fig. 6 of the drawings. The inner slide 61 may be provided with an offset arm 67, carrying a stop member 68 for engagement with a portion 69 of the supporting member 58 or other stationary member, whereby the slide 61 may be halted in its downward movement and the slide 62 further advanced. The coiled spring 63' normally holds the offset arm 67 substantially in contact with the shoulder 64' of the outer slide 62. The inner slide 61 has a plate 70 adjustably secured thereto, as by screws 71, which plate is in turn secured to a pair of retractile holder members 72 mounted upon opposite sides of the former 66 and movable relative thereto upon movement of the slide 61 relative to the slide 62. A coiled spring 74 serves to return the compound slide 60 to its upper or retracted position after actuation by the rocker arm 64.

A lower former 76 is slidably supported by a sleeve block 77, which may be secured to the base 1 by a screw 78, and which is adapted to be raised in timed relation with the downward movement of the upper former 66 by means of a rocker arm 79 pivotally supported by a pivot 80 carried by the base 1, and which may be actuated by a cam 81 carried by the cam shaft 3.

A shaping block 82 is carried by a reciprocating slide 83 which may be slidably mounted in a recess formed in the frame 1 and held against displacement by a plate 84. The slide 83 may be pivotally connected, as to the base 1, by a link 84' which is positioned for engagement by a cam 85 carried by the cam shaft 3 to withdraw the shaping block 82 out of the path of the former 66 at suitable intervals. A coiled spring 86, or other suitable means, may be employed to advance the shaping block 82 into position for shaping a connecting member at suitable intervals when permitted by the cam 85. The shaping block 82 is provided with a projecting shaper arm 87 positioned within the path of movement of the former 66 and between the retractile holder members 72 when the shaping block is in its advanced position, and an adjustable stop member 88 may also be carried by the shaping block and located within the path of travel of the metal strip 36.

A link receiving shelf 90 may be secured to the die block 20, as by a screw 91, or suitably secured to another portion of the frame or base, and is provided with a channel portion 92 forming a continuation of the channel 18 of the die block for receiving the separated and formed chain links from the die block in such a manner that they may be retained in close proximity to each other and advanced intermittently by the intermittent feed means so as to bring the separated links into accurate relationship with the formers 76 and 66 for the reception of the connecting members after the manner illustrated in Figs. 8 to 10 of the drawings. The channel 92 formed in the shelf 90 is also provided with upper and lower openings 93 and 94 adapted to be positioned above and beneath the formed links respectively and arranged to receive the upper former 66 and the lower former 76.

In the mode of operation of the means above described and the method employed for connecting chain links a suitable metal strip 17, of any desired surface configuration, is advanced intermittently by the gripping blocks 8 and 9 into the channel 18 of the die block 20 to be acted upon by dies 24 for ornamenting and/or shaping and separating the metal strip 17 into separate chain links 95, which are provided with openings 96 adapted to receive connecting members for joining the proximate ends of adjacent links together to form a completed chain.

The chain links 95 thus formed are advanced by movement of the metal strip 17 into the open channel 92 of the link receiving shelf 90, and into position to be connected together by preformed connecting members as will be further described hereinafter.

In suitable relation with the advancement of the metal strip 17 and the formation of the chain links 95, the metal strip 36 is advanced by the gripping blocks 31 and 32 along the channel 46 and beneath the anvil 48 in a plane offset from the plane of movement of the metal strip 17. As the metal strip 36 is advanced intermittently, each degree of its advancement is adapted to coincide substantially with the distance separating the stop member 88 and the cutter blade 50, whereby the sections cut from the metal strip 36 are of substantially uniform length and of the length desired for connecting the particular chain links being formed. The cutter blade 50 is raised after contact is made by the end of the strip 36 with the stop 88 to sever a section 97 of the metal strip corresponding substantially in length with the distance separating the stop member and cutter blade. The section thus severed is located above the shaper arm 87, which has previously been advanced by the spring 86. Immediately upon the severing of the section 97, the compound slide 60 descends sufficiently to bring the retractile holding members 72 into engagement with the portions of the section 97 located upon opposite sides of the shaper arm 87. Further downward movement of the compound slide 60 serves to bend the section 97 into a substantially U-shaped form to provide a central portion 98 and substantially straight end portions 99 while at the same time causing the central portion 98 of the section to be forced between the retractile holding members 72, where the section 97 is held by the retractile members 72 for transfer into connecting relation with adjacent chain links. Upon the completion of the bending of the section 97 and its positioning between the retractile holding members 72 the shaping block 82 is retracted or drawn backwardly out of the path of movement of the former 66 through operation of the cam 85. The compound slide 60 then continues its advance to bring the end portions 99 of the formed section 97 into position to enter suitable openings 96 in adjacent links 95 supported by the link receiving shelf 90, after the manner shown in Fig. 8 of the drawings. When the ends 99 of the U-shaped section 97 have entered the openings formed in adjacent links the retractile members 72 are halted in their forward movement through engagement of the stop member 68 with the portion 69 of the supporting member, thus permitting the slide 62 to continue its advance while the slide 61 is held against further downward movement. The U-shaped section or partially completed holding member 97 is thus freed from engagement by the retractile members 72 and forced into the openings 96 formed in adjacent links by the former 66, while at the same time the lower former 76 moves upwardly to cooperate with the former 66 in bending over the ends 99 of the section 97 to form the complete connecting member after the manner shown in Fig. 10 of the drawings.

As previously described, the shape of the cutter blade and its manner of operation serves to form outwardly inclined surfaces 101 upon the end face of each end portion 99 of the section 97, which results, when the holding member 97 is bent into the position shown in Fig. 10, in bringing the outer edges 102 of the inclined surfaces 101 into substantially continuous interfitting relation with each other throughout their extent whereby a smooth and substantially continuous outer surface is provided for the connecting member.

This bringing of the outer edges of the inclined end portions into close engagement with each other throughout their extent, which is obtained through the formation of the beveled or inclined ends, may be effected substantially without regard to the precise shape into which the connecting member is bent, that is, whether the outer surface formed by the joined edges is of oval shape, as shown, or the side containing the meeting edges is substantially flat, or whether the connecting member is so shaped that its meeting end edges are turned inwardly beyond other parts of the end portions to form an outwardly facing angle.

It will be seen that by the employment of my improved method and means for connecting chain links, connecting members may be inserted in either relatively narrow or relatively wide openings formed in the chain links with equal facility, since they are inserted along substantially straight line paths. Moreover, a uniformly smooth outer surface is provided for each connecting link through the formation of inclined surfaces on the end faces of the end portions of the connecting members, which inclined surfaces are brought together so as to effect a close joining of the outer edges thereof.

The provision of the upwardly moving cutter blade having an oppositely inclined cutting edge movable against an anvil located above the metal strip serves to form the outwardly inclined end surfaces 101 upon both ends of each section in position for the end edges to be brought into close engagement when bent to form the complete connecting member, and the outwardly inclined end surfaces further aid in inserting the bent connecting member into links having narrow openings formed therein.

The metal strips 17 and 36 may be formed of any suitable metal stock which may be provided upon one face with any desired surface ornamentation such as it may be desirable to reproduce in the formed links or connecting members, and each chain link may be provided with a single wide opening extending from a point adjacent to one end to a point adjacent the other or with relatively narrow openings located adjacent to the opposite ends.

What I claim is:—

1. The method of making a chain structure through forming alternate links from separate strips of sheet metal stock and connecting the links in a continuous operation which comprises, advancing said separate strips along different straight line paths into positions of transversely opposed relation with each other, subjecting one of said strips to a series of operations to form link members and separate said link members from the strip and from each other prior to the advancement of said link members into a position of transversely opposed relation with the other strip, separating and shaping connecting link members from a portion of said second named strip in opposed relation with adjacent link members, moving said connecting link members each by a single movement from the point of its formation in a straight line path at right angles to the plane of movement of the strip and into connected relation with adjacent link members, and then bending portions of said connecting link members to secure said adjacent link members together and form a chain.

2. The method of forming a chain structure comprising alternate link and connecting link members which comprises, feeding continuous link and connecting link member forming strips along parallel planes into transversely opposed relation with each other, forming and separating link members having openings in opposite ends thereof from said link member forming strip prior to its advancement into opposed relation with said connecting link member forming strip, forming connecting link members from said connecting link member forming strip in opposed relation with adjacent link members in such a manner as to provide spaced end portions therefor, moving said connecting link members each by a straight line continuous movement from the point of its formation in a direction at right angles to the plane of movement of said strip to pass the spaced end portions thereof through the openings formed in adjacent link members, and bending over the inserted end portions to interconnect the link members together.

3. The method of making a chain structure through forming alternate links from separate strips and connecting the links together in a continuous operation which comprises, advancing said separate strips towards each other along parallel paths located in transversely opposed relation with each other towards a common operating point, forming link members from one of said strips and separating said link members from the strip prior to their advancement to the common operating point, forming connecting link members from the other of said strips, moving said connecting link members when formed in a continuous straight line path transversely of said strip and each into connected relation with adjacent link members, and bending portions of each connecting link member to form a connecting link between adjacent link members.

4. The method of making a chain structure through forming alternate link and connecting link members from separate strips and connecting the links together in a continuous operation which comprises, advancing separate strips towards each other along parallel paths which are located in transversely opposed relation, forming link members from one of said strips and separating said link members from each other, forming connecting link members from the other strip, moving said connecting link members each in a direction at right angles to the plane of movement of its strip and by a continuous straight line path directly to connect the same with two adjacent link members, and bending portions of each of said connecting link members into position to connect said link members together to form a chain.

5. In a chain making machine, means for advancing continuous strips of metal stock in opposite directions along parallel paths in transversely opposed relation with each other towards a common operating point, means for shaping one of said strips to form link members, means located upon one side of said operating point for separating said formed link members, means located at said operating point for acting upon the other of said strips to form separate connecting links, and means movable at right angles to the plane of movement of one of said strips for uniting each of said connecting link members to adjacent link members formed from said first named strip to make a continuous chain structure.

6. In a chain making machine, means for advancing continuous strips of metal stock in opposite directions along horizontal parallel paths in vertically opposed relation with each other towards a common operating point, means for shaping one of said strips to form link members and means for separating said link members from the strip while advancing them along the path of movement of the strip, means for forming connecting link members from the other said strip, and means movable transversely of the paths of travel of said strips for moving each connecting link member into connected relation with two adjacent link members and bending portions of each connecting link member into connecting engagement with said adjacent link members.

7. In a chain making machine, a horizontal support, means carried by said support for guiding continuous strips along parallel paths towards positions of vertically opposed relation with each other, a common operating shaft, means actuated by said shaft for advancing said strips towards each other, means actuated by said shaft for shaping one of said strips to form link members, means actuated by said shaft for separating said link members from the strip, means actuated by said shaft for shaping connecting link members from the other metal strip, and means movable across the paths of travel of said strips for connecting each connecting link member with two adjacent link members when said adjacent link members reach a position in vertically opposed relation with a portion of said connecting link member forming strip.

8. In a chain making machine, means for advancing a strip of sheet material in the direction of its length, means acting upon said strip to form link members and separate said link members from the strip, means located in vertically spaced relation with the path of travel of said strip for forming separate connecting link members, and cooperating means for moving each of said connecting link members at right angles to the patch of travel of said strip and uniting each of said connecting link members with adjacent link members to form a chain.

9. In a chain making machine, means for advancing a continuous strip of material in the direction of its length, means acting upon said strip to form link members, means for separating said link members from the strip, means for advancing a second strip into a position of transversely spaced opposed relation with a portion of the path of movement of said first named strip, means operable to form successive connecting link members from said second named strip, means movable transversely of the path of movement of said first named strip for moving said connecting link members each into connected engagement with adjacent link members, and means for bending portions of said connecting link members into position to connect said adjacent link members and form a chain.

10. In a means for connecting separated link members each having openings formed therein and located adjacent to opposite ends thereof, means for advancing said link members in proximate relation to each other and in the direction of their longitudinal axes along a horizontal path, means offset vertically from the path of movement of said link members for forming connecting members, and horizontally fixed connecting member holding and bending means movable vertically towards and from the path of movement of said link members for passing portions of each connecting member through openings formed in adjacent link members and bending portions of said connecting member to connect said link members.

11. In a means for connecting separated preformed link members, each having openings formed therein and located adjacent to opposite ends thereof, to form a chain, means for advancing said link members in proximate relation with each other along a common path, means offset from and in opposed relation with the path of movement of said link members for forming connecting members, and means spaced from the plane of said link members but located in opposed relation with the path of movement of said link members for passing portions of each connecting member through openings formed in adjacent link members and bending portions of each said connecting member to connect said link members.

12. In a mechanism for successively connecting separated chain links each having openings formed therein and located adjacent to opposite ends thereof, means for advancing said chain links successively along a horizontal path in proximate relation with each other, means for advancing a metal strip into a position of vertically opposed spaced relation with a portion of said path, means for forming connecting members from said metal strip, horizontally fixed vertically movable means for passing portions of each connecting member through openings formed in adjacent links, and means for bending portions of said connecting members to connect said adjacent links and form a chain.

13. The method of forming a chain which comprises, positioning separate formed chain links each having separate openings located adjacent to its ends in fixed relation with each other, forming a U-shaped connecting member having outwardly inclined ends, moving each U-shaped connecting member from the point of its formation by a single continuous movement at right angles to the plane of the links to insert the ends of said connecting member within the openings formed in adjacent ends of proximate links, and bending over the ends of said connecting member to bring the outer edges of the inclined end portion into substantially complete edge contact with each other.

14. In a means for connecting chain links, the combination with a plurality of separated chain links each provided with an opening located adjacent to each end thereof and means for advancing said chain links simultaneously along a common path in a fixed plane, of a metal strip, means for feeding said metal strip into a position of opposed parallel relation with said chain links, means for cutting and shaping sections of said metal strip to form connecting members, and means for moving each connecting member in a direction at right angles to the plane of said chain links and into position to pass the ends of said connecting member through adjacent openings formed in proximate chain links.

15. In a means for connecting chain links, two or more separated chain links arranged in aligned relation, means for advancing said chain links simultaneously, a metal strip, means for moving said metal strip into laterally spaced opposed relation with two adjacent chain links, means for separating said metal strip into successive sections, and means for shaping each section and moving it bodily along a straight line path at right angles to the plane of and into linking relation with said adjacent chain links.

16. In a means for connecting separated chain links each having spaced openings formed therein and located adjacent to opposite ends thereof, means for advancing said chain links in the direction of their longitudinal axes along a common path, a strip of metal stock, means for feeding said metal strip into a position of substantial parallelism with the chain links, means for forming connecting members from said metal strip having spaced parallel portions and inclined ends, means for moving each connecting member from the point of its formation along a straight line path perpendicular to the plane of said links and inserting the ends of said connecting member within adjacent openings in proximate chain links, and opposed means for forcing the ends of the connecting member within the openings in the chain links and bending over the ends of the connecting member to firmly connect the chain links.

17. In a means for connecting separated chain links each having spaced openings formed therein and located adjacent to opposite ends thereof, means for advancing said chain links in the direction of their longitudinal axes along a horizontal path, a metal strip, cutting and shaping means for forming connecting members from said metal strip, horizontally fixed holding and guiding means for moving the formed connecting members vertically into position to be forced into interlocking engagement with adjacent chain links, and means for forcing the connecting members into interlocking engagement with said chain links and effecting their permanent attachment thereto in such a manner as to hold adjacent chain links in connected relation while permitting articulation of the links relative to each other.

18. In a means for connecting chain links each having openings formed therein and located adjacent to opposite ends thereof, means for advancing said chain links in the direction of their longitudinal axes along a horizontal path, a strip of metal stock, means for feeding said stock into a position of vertically opposed relation with adjacent chain links, cutting, shaping and transfer means for cutting off a section of said metal stock, shaping it and transferring it into position for attachment to adjacent chain links, said transfer means being movable only in a direction perpendicular to the plane of movement of the links for passing portions of said section through openings formed in adjacent links, and vertically movable means for forcing portions of said section through the openings in said links and bending said portions to connect the links firmly together.

19. In a means for connecting chain links, means for supporting a plurality of separated chain links in aligned relation with each other, means for advancing said chain links simultaneously while maintaining them in aligned relation with each other, means for advancing a metal strip into a position of opposed relation with certain of said links, intermittently operating means for forming connecting members from said metal strip, and opposed reciprocating means movable perpendicularly to the plane of said chain links for successively moving said connecting members into linking relation with and connecting them to adjacent chain links.

20. The method of making a chain structure which comprises, advancing separate link members, each having an opening located adjacent to opposite ends thereof, along a straight line path and in proximity to each other towards an operating point, advancing a strip of metal stock along a straight line path into a position of transversely opposed relation with the path of travel of said link members at the operating point, severing and forming connecting link members from said metal strip at a point in substantial opposition with said operating point, moving said connecting link members each along a straight line path located at an angle to the plane of movement of said link members at the operating point to pass portions of said connecting link members through the openings formed in adjacent link members, and then bending portions of said connecting link members to secure said adjacent link members together and form a chain.

CHRISTIAN F. KOHM.